US010885534B1

(12) United States Patent
Ambaldhage et al.

(10) Patent No.: US 10,885,534 B1
(45) Date of Patent: Jan. 5, 2021

(54) DETERMINING PRODUCT DEMAND

(71) Applicant: Amazon Technologies, Inc., Seattle, WA (US)

(72) Inventors: Kiran Kumar Ambaldhage, Bangalore (IN); Rumit Kumar Sehlot, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 666 days.

(21) Appl. No.: 14/626,609

(22) Filed: Feb. 19, 2015

(51) Int. Cl.
*G06Q 30/02* (2012.01)
*G07C 13/00* (2006.01)

(52) U.S. Cl.
CPC ......... *G06Q 30/0202* (2013.01); *G07C 13/00* (2013.01)

(58) Field of Classification Search
None
See application file for complete search history.

(56) References Cited

U.S. PATENT DOCUMENTS

| | | | | |
|---|---|---|---|---|
| 2002/0107861 A1* | 8/2002 | Clendinning | ......... | G06F 16/283 |
| 2003/0167213 A1* | 9/2003 | Jammes | ............. | G06Q 30/0641 |
| | | | | 705/26.62 |
| 2004/0143481 A1* | 7/2004 | Li | ........................ | G06Q 10/101 |
| | | | | 705/7.32 |
| 2007/0061220 A1* | 3/2007 | Vaid | ................... | G06Q 30/0254 |
| | | | | 705/14.52 |
| 2007/0192168 A1* | 8/2007 | Van Luchene | ....... | G06Q 10/047 |
| | | | | 705/14.54 |
| 2012/0203675 A1* | 8/2012 | Hassan | ............. | G06Q 30/0241 |
| | | | | 705/27.2 |
| 2015/0051949 A1* | 2/2015 | Pickton | ............. | G06Q 30/0202 |
| | | | | 705/7.31 |
| 2015/0371189 A1* | 12/2015 | Hanuschak | ............ | G06Q 20/28 |
| | | | | 705/7.31 |

FOREIGN PATENT DOCUMENTS

CA    2817352 A1 * 11/2013   ........... G06F 16/951

OTHER PUBLICATIONS

WebPersonify will make your websites smarter using personalization. https://www.webpersonify.com. (Nov. 25, 2019). PR Newswire Retrieved from https://search.proquest.com/docview/2317583036?accountid=14753 (Year: 2019).*

* cited by examiner

*Primary Examiner* — Patricia H Munson
*Assistant Examiner* — Nancy Prasad
(74) *Attorney, Agent, or Firm* — Kilpatrick Townsend & Stockton LLP

(57) ABSTRACT

Embodiments of methods, systems, and storage media associated with height-based item retrieval are described. A product demand determination system ("PDS") may receive an indication of a product which a customer may desire to purchase. If the product is not available for purchase, the PDS may request information about the desired product. The PDS may then generate a product demand page which may allow customers to provide feedback as to whether the desired product should be sold. The PDS may also determine, based in part on the feedback, whether the e-commerce system should provide the desired product for sale based on various market considerations. Additionally, the PDS may be configured to receive seller information from one or more sellers who may wish to sell the desired product or service. Other embodiments may be described and/or claimed.

20 Claims, 9 Drawing Sheets

DETERMINING PRODUCT DEMAND

BACKGROUND

E-commerce, which may include shopping for both products and services, has become an integral part of the modern retail experience. Customers use e-commerce websites to browse and compare hundreds of thousands of products. Customers enjoy using these websites because they address customer needs such as: reducing the time need to shop, generating a large pool of available products, minimizing excess costs due to logistics, easing performance of sales transactions, etc.

However, as customers become more and more savvy and demand more niche items, current e-commerce systems may begin to fall short. It can be well-nigh impossible for an e-commerce system to carry any and all products or services that may be demanded by customers. It can be difficult for an e-commerce system to know which products or services are likely to be popular and/or profitable. Also, when an e-commerce system does not carry a product or service desired by a customer, it can be very difficult for the customer to inform the company of the product and ask for it to be carried.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
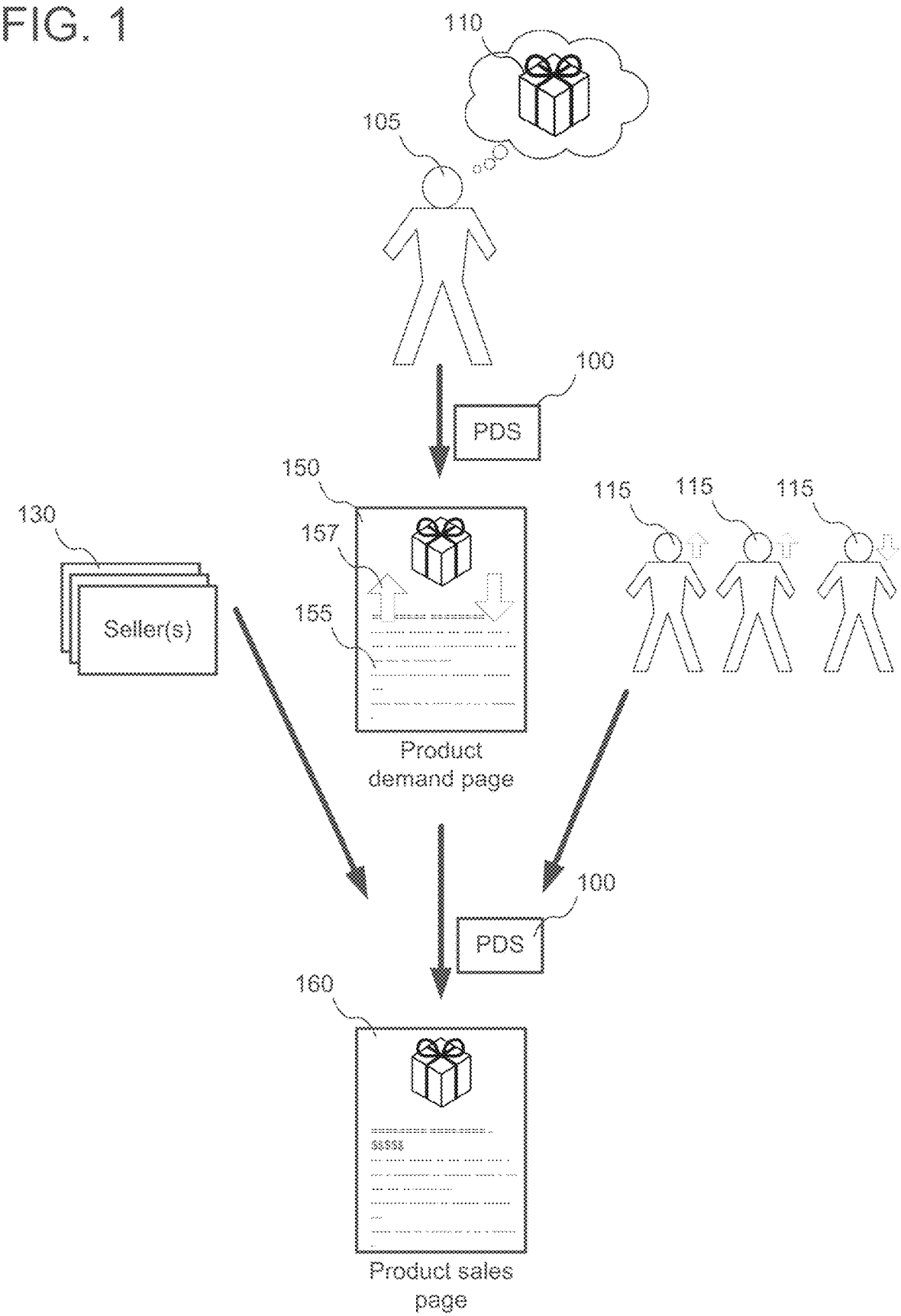
FIG. 1 is a diagram illustrating an example of determining demand for a product, in accordance with various embodiments.

Techniques described provide for determination of product demand using a product demand determination system ("PDS"). In various embodiments, the PDS may be configured to receive an indication of a product or service which a customer may desire to purchase in an e-commerce system. The PDS may determine whether the desired product or service is available for purchase. If the product is not available for purchase, the PDS may request that the customer provide information about the desired product or service. The customer may then provide information about the desired product or service via various techniques, such as by direct entry, identification of a product using a name, Universal Product Code or other identifier, searching for product or service information using databases, retrieval of product or service information from a website, etc.

After receipt of information about the desired product or service, the PDS may then generate a product demand page which may be provided to the customer as well as other, later-arriving customers that may search for the same product or service, or for a similar product or service. The product demand page may be configured to allow customers to provide feedback as to whether the associated e-commerce system should provide the desired product or service for sale. In various embodiments, the feedback may take the form of votes for the desired product or service, although in other embodiments, other feedback techniques may be used.

The PDS may also be configured to determine, based at least in part on the feedback received from customers, whether the e-commerce system should provide the desired product or service for sale. The PDS may be configured to determine whether the desired product or service should be made available for purchase based on various market considerations, including, but not limited to, demand (measured locally, regionally, and/or nationally), legal or regulatory barriers to market entry, and/or profit or revenue that is likely to be obtained from sale of the desired product or service. Additionally, in various embodiments, the PDS may be configured to receive seller information from one or more sellers who may wish to sell the desired product or service, either as direct third-party sellers using the e-commerce system, or as suppliers for the e-commerce system itself. In various embodiments, the seller information may include information such as price information, reputation data, and/or likely profit or revenue that may be obtained by allowing third-party sales of the desired product in the e-commerce system.

It may be noted that, in the foregoing description and in the description to follow, references are made to, for example, "desired products" as well as "products that are offered for purchase." It maybe recognized that the term "product" is used for ease and clarity of description and is not intended to suggest or require any particular limitations on products, services, businesses, and or markets with which embodiments described herein may be used. Thus, for example, the product determination techniques described herein may be utilized with physical products, including books, physical media, toys, electronics, apparel, etc. Additionally, techniques described herein may be utilized in association with digital products, such as software or digital media and others. Additionally, in various embodiments, the PDS may be configured to determine demand for services in addition to or in lieu of products. It is also noted that, while reference is made to "sellers" in the below description, no particular limitation is intended and seller information may include information about sellers of suppliers of various products and services.

Referring now to FIG. 1, a diagram illustrating an example of determining demand for a product is illustrated in accordance with various embodiments. In the example of FIG. 1, a customer 105 may desire to purchase a desired product 110. The customer may search an e-commerce system (not illustrated) for information about the desired product 110, such as to purchase the product. In the example of FIG. 1, the desired product 110 may not be available for purchase on the e-commerce system, and so a product demand determination system 100 ("PDS 100") may generate a product demand page 150 for the desired product 110. In various embodiments, the product demand page 150 may include a description 155 of the desired product 110, along with feedback elements 157 through which customers may provide feedback as to whether the desired product should be sold by the e-commerce system. In various embodiments, the product demand page 150 may also provide a facility for customers to request notification if the associated product (or one similar to it) is later offered for purchase.

In various embodiments, the PDS 100 may also determine whether the desired products should be made available for purchase on the e-commerce system. As illustrated, the PDS 100 may receive customer feedback from one or more other customers 115 as well as information about the desired product 110 from the product demand page 150. The PDS 100 may also receive seller information from one or more sellers 130. The PDS 100 may, in turn, determine that the desired product 110 should be made available for purchase on the e-commerce system (either by the e-commerce system acting as a direct retailer or by allowing third-party sales of the desired product). Thus, the PDS 100 may cause a product sales page 160 to be generated, allowing customers to come to the e-commerce system to purchase the desired product.

Figure 2:
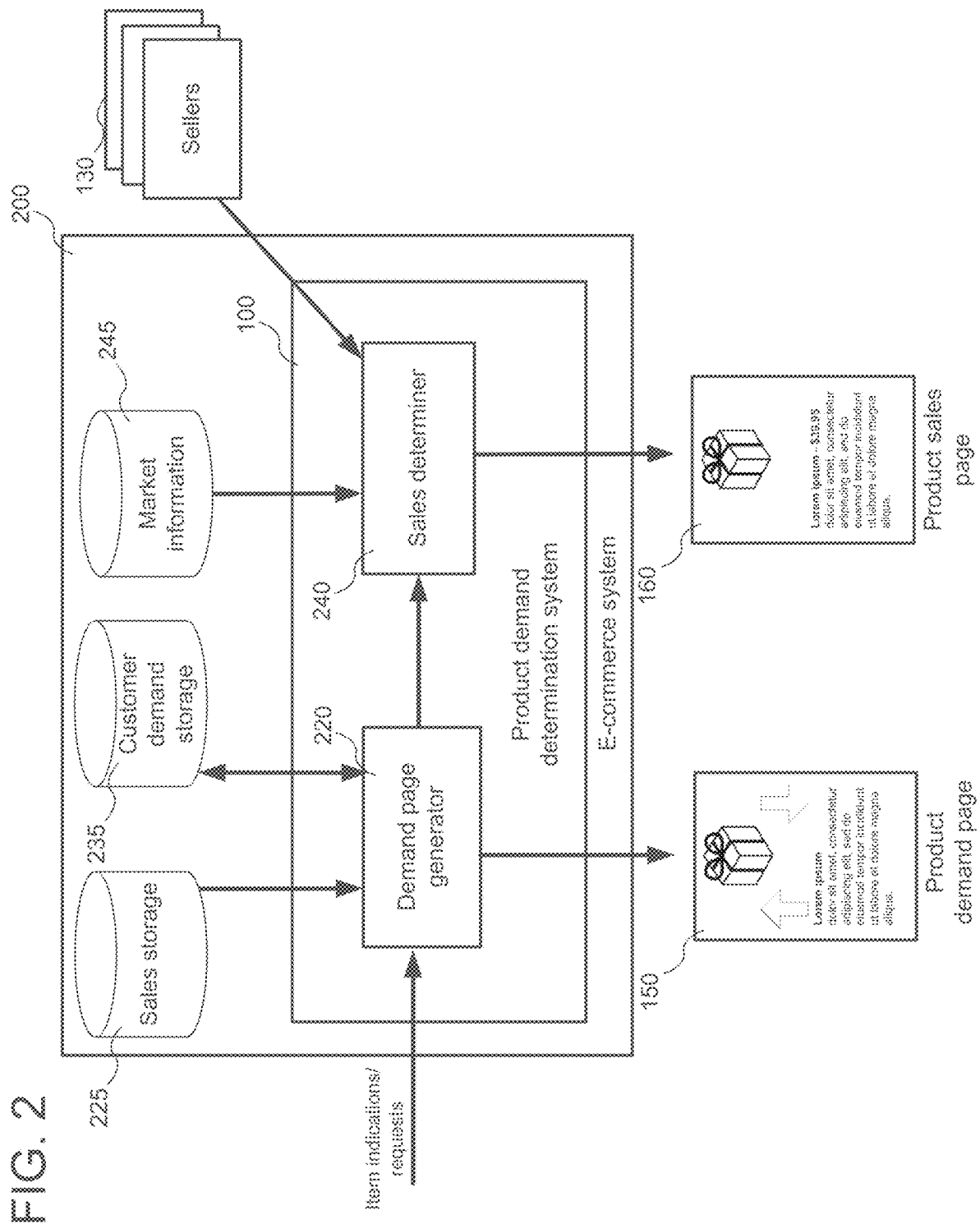
FIG. 2 is a block diagram illustrating example logical components and interaction points of a product demand determination system, in accordance with various embodiments.

Referring now to FIG. 2, a block diagram of example logical components and interaction points of the PDS 100 is illustrated in accordance with various embodiments. In various embodiments, the PDS 100 may include a demand page generator 220 ("DPG 220"). The DPG 220 may, in various embodiments, be configured to receive indications or requests for item and to determine when a searched-for product or service is not currently available for purchase in an e-commerce system 200 associated with the PDS 100. In various embodiments, the DPG 220 may make such a determination utilizing a sales storage 225, which may be configured to store information about products or services that are currently available for purchase in the e-commerce system 200. The sales storage 225 may, in various embodiments, be included with the PDS 100 or be maintained externally to the PDS 100. In various embodiments, the sales storage 225 (as well as the other storages described herein) may be implemented according to various storage techniques known to those of ordinary skill in the art, including databases, local storage, networked storage, etc. In various embodiments, in response to determining that the desired product 110 is not available for purchase, the DPG 220 may be configured to generate the product demand page 150 for the desired product 110. In various embodiments, the DPG 220 may also be configured to store information associated with the product demand page 150 (which may include the product demand page 150 itself) in a customer demand storage 235. In various embodiments, the DPG 220 may store feedback received from customers in the customer demand storage 235 and to provide this information for later determination about whether to sell the desired product 110.

In various embodiments, the PDS 100 may also include a sales determiner 240 ("SD 240") which may be configured to determine whether or not to provide the desired product 110 for purchase on the e-commerce system 200 associated with the PDS 100. In various embodiments, if the SD 240 determines that the desired product 110 should be offered for sale, the SD 240 may cause a product sales page 160 to be generated for the desired product. In some embodiments, the SD 240 may generate the product sales page 160 itself; in other embodiments, the SD 240 may cause another entity (such as, for example, the e-commerce system 200 or a third party seller) to generate the product sales page 160. In various embodiments, the SD 240 may be configured to determine whether the desired product should be sold by determining likely profit and/or revenue to result from offering the desired product for sale. Particular implementations of actions performed by the SD 240 are described below.

In various embodiments, the SD 240 may be configured to obtain market information from market information storage 245. In various embodiments the market information may include information such as sales figures for the desired product 110 (and/or similar products), customer preferences regarding the desired product 110 or other products, regulations and/or laws restricting sales or usage of the desired product 110 or other products. In various embodiments, market information maintained at the market information storage 245 may include information relating to various groups of customers or other persons, such as demographic groups defined by age, localities, geographic regions, nationalities, gender, socioeconomic status, etc. In various the SD 240 may be configure to receive seller information from one or more sellers 130. In various embodiments, the SD 240 may generate or cause to be generated a seller information page where one or more sellers may provide seller information. As discussed herein, seller information may include, but is not limited to, seller history/reputation, offer price, offer amount, etc.

Figure 3:
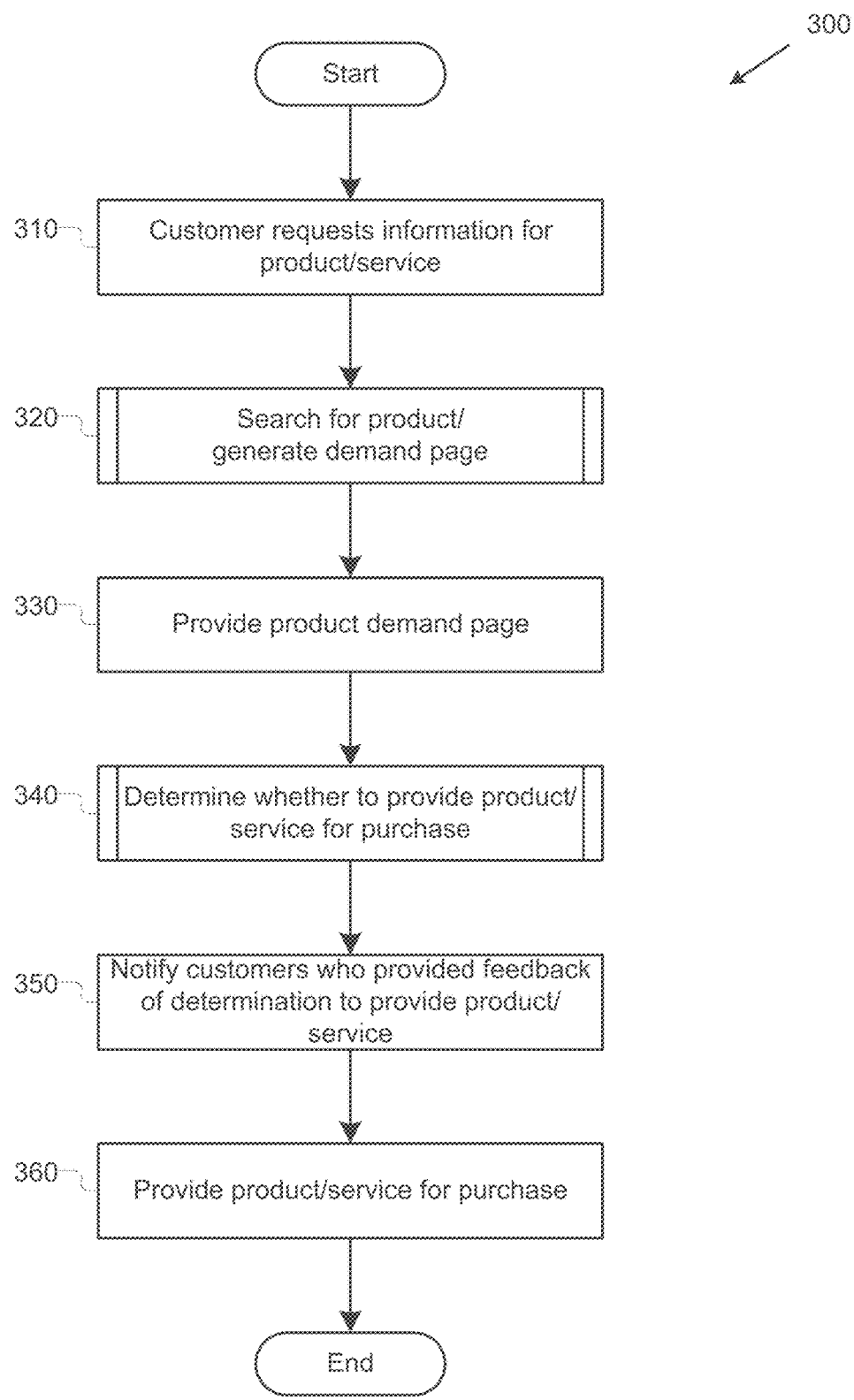
FIG. 3 is a flowchart illustrating an example process for determining demand for a product or service in accordance with various embodiments.

FIG. 3 is a flowchart illustrating an example process 300 for determining demand for a product or service in accordance with various embodiments. While particular examples and orders of operations are illustrated in FIG. 3, in various embodiments, these operations may be re-ordered, broken into additional operations, combined, and/or omitted altogether. The process may begin at operation 310, where a customer may request information about a product or service from the e-commerce system 200. In various embodiments, the request may include a request to purchase the product or service. In other embodiments, the request may include a request for information about the product or service. In various embodiments, the request may be performed by the customer entering one or more search terms in a search entry.

Next, at operation 320, the PDS 100 may search for the desired product or service and, if needed, may generate a product demand page 150. Embodiments of operation 320 are described below with reference to process 400 of FIG. 4. Next, at operation 330, the PDS 100 may provide the generated product demand page 150, such as to other customers. In various embodiments, the product demand page 150 may be provided as a search result for searches on the e-commerce system 200. For example, in some embodiments, if a customer searches for the desired product or for a similar product, the product demand page 150 may be provided to the searching customer. In another embodiment, a listing for the product demand page 150 may be provided to a searching customer alongside listings for product sales pages 160.

Next, at operation 340, the PDS 100 may determine whether or not to provide the product or service for purchase. Embodiments of operation 340 are described below with reference to process 600 of FIG. 6. Next, if the determination at operation 340 was that the desired product or service should be sold, then, at operation 350, the PDS 100 may inform customers that the product or service is now available for purchase. In various embodiments, the PDS 100 may inform specific sets of customers, such as those customers that have provided feedback, only those that have requested to be notified, or those that have provided positive feedback. Next, at operation 360, the PDS 100 may cause the product or service to be provided for purchase. For example, the PDF 100 may generate a product sales page 160 or may allow a third party seller to generate a product sales page 160; these product sales pages 160 may then be provided as search results on the e-commerce system 200. The process may then end.

Figure 4:
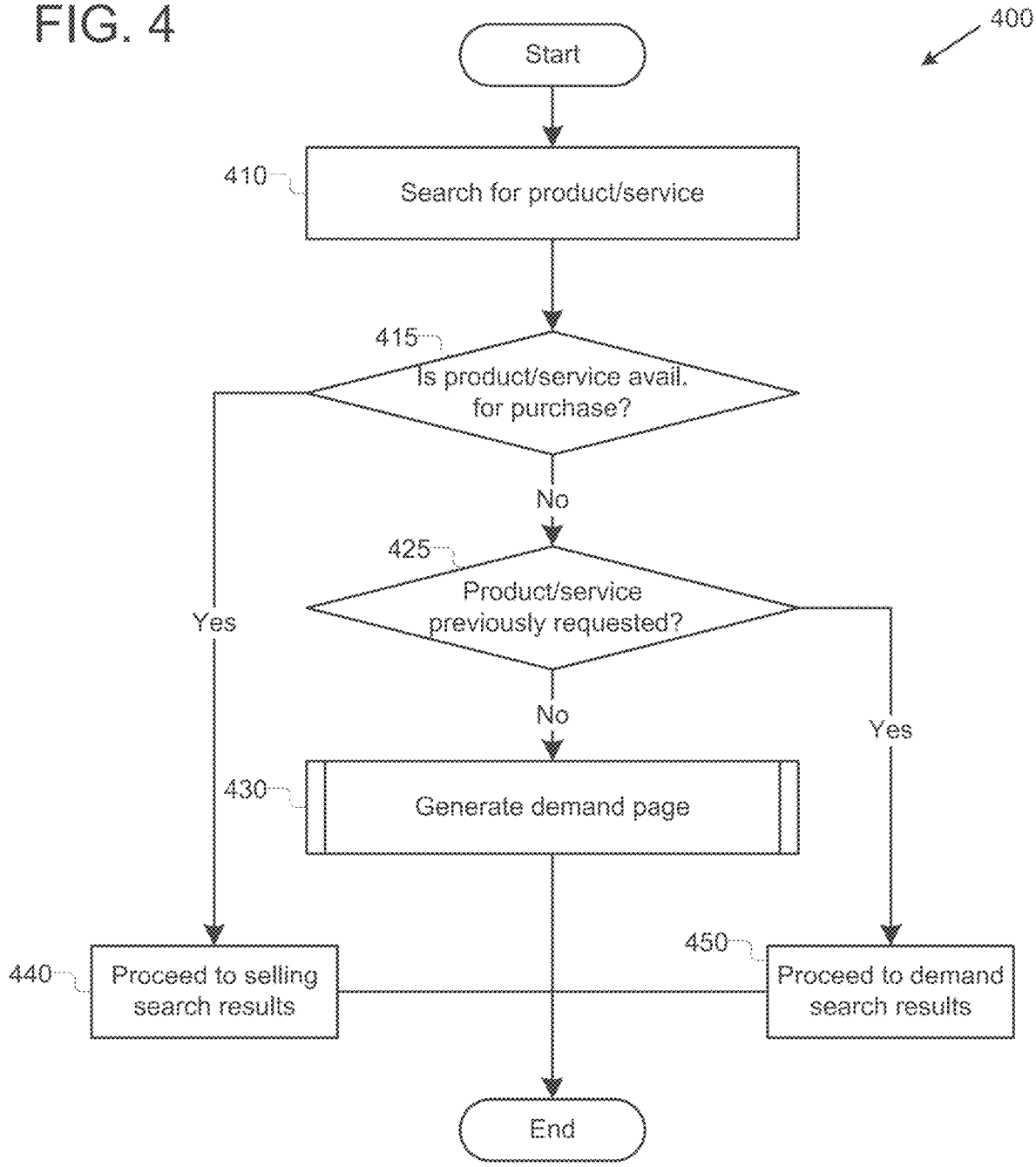
FIG. 4 is a flowchart illustrating an example process for searching for a desired product or service, in accordance with various embodiments.

FIG. 4 is a flowchart illustrating an example process 400 for searching for a desired product or service and generating a product demand page, in accordance with various embodiments. In various embodiments, process 400 may implement 320 of process 300 of FIG. 3. While particular examples and orders of operations are illustrated in FIG. 4, in various embodiments, these operations may be re-ordered, broken into additional operations, combined, and/or omitted altogether. In various embodiments, operations of process 400 may be performed by the DPG 220 of the PDS 100. The process may begin at operation 410, where the DPG 220 may search for the desired product or service, such as in the sales storage 225. At decision operation 415, the DPG 220 may determine whether the desired product or service is currently available for purchase. If so, then at operation 440, the DPG 220 may proceed to providing the search results to the customer and the process may then end. If, however, at decision operation 415 the DPG 220 determines that the desired product or service is not being sold, then at decision operation 425, the DPG 220 may determine whether the desired product or service was previously requested (and therefore that a product demand page 150 may have been generated for the desired product or service). If so, then at operation 450, the DPG 220 may provide the customer with demand search results (such as a product demand page 150) and the process may then end. If, however, the product has not been previously requested, then at operation 430, the DPG 220 may generate a product demand page 150 for the desired product or service. Embodiments of operation 430 are described below with reference to process 500 of FIG. 5. The process may then end.

Figure 5:
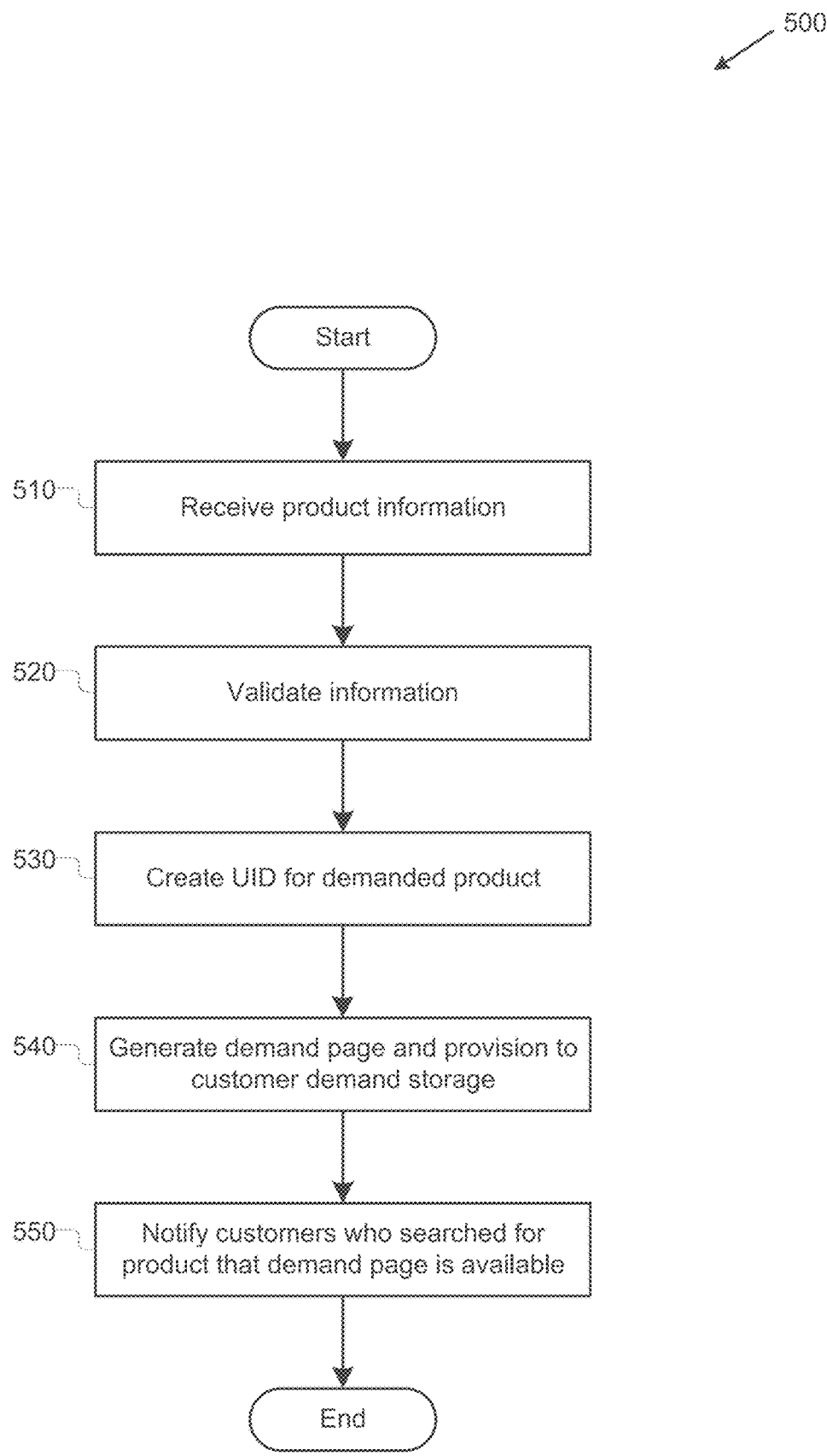
FIG. 5 is a flowchart illustrating an example process for generating a product demand page, in accordance with various embodiments.

FIG. 5 is a flowchart illustrating an example process 500 for generating a product demand page 150, in accordance with various embodiments. In various embodiments, process 500 may implement 430 of process 400 of FIG. 4. While particular examples and orders of operations are illustrated in FIG. 5, in various embodiments, these operations may be re-ordered, broken into additional operations, combined, and/or omitted altogether. In various embodiments, operations of process 400 may be performed by the DPG 220 of the PDS 100. The process may begin at operation 510, where the DPG 220 of the PDS 100 may receive product information from the customer who requested the desired product or service. The product information received may include various product information used to identify a product so that feedback may be received regarding the product. In various embodiments, such information may include, but is not limited to: product name, product type, brand name, price, location of origin or production, identities of similar products, previous names, etc. In various embodiments, the DPG 220 may receive product information by requesting that the customer enter the product information, such as in a web form or other interactive user interface. In other embodiments, other techniques may be utilized for obtaining product information, such as obtaining information from a website associated with the product, which may be identified using a uniform resource locator ("URL") provided by the customer, or a universal product code ("UPC").

Next, at operation 520, the DPG 220 may validate the obtained product information. For example, the DPG 220 may review the information for consistency of spelling or values, or may compare the information to other sources such as publicly available web pages, or products databases. Next, at operation 530, the DPG 220 may generate a unique identifier for the desired product or service. This may be utilized to that the generated product demand page 150 may be uniquely identifiable and/or so that later searches for the product may result in provisioning of a previously generated product demand page 150 and not generation of new page. Next, at operation 540, the DPG 220 may generate a product demand page 150 and provision the product demand page 150 to the customer demand storage 235. As discussed above, in various embodiments, the product demand page 150 may include one or more user interface elements through which customers may provide feedback about the desired product or service. At operation 550, the DPG 220 may then inform customers that the product demand page 150 has been generated. In various embodiments, the DPG 220 may inform specific sets of customers, such as those customers that have only those that have requested to be notified. The process may then end.

Figure 6:
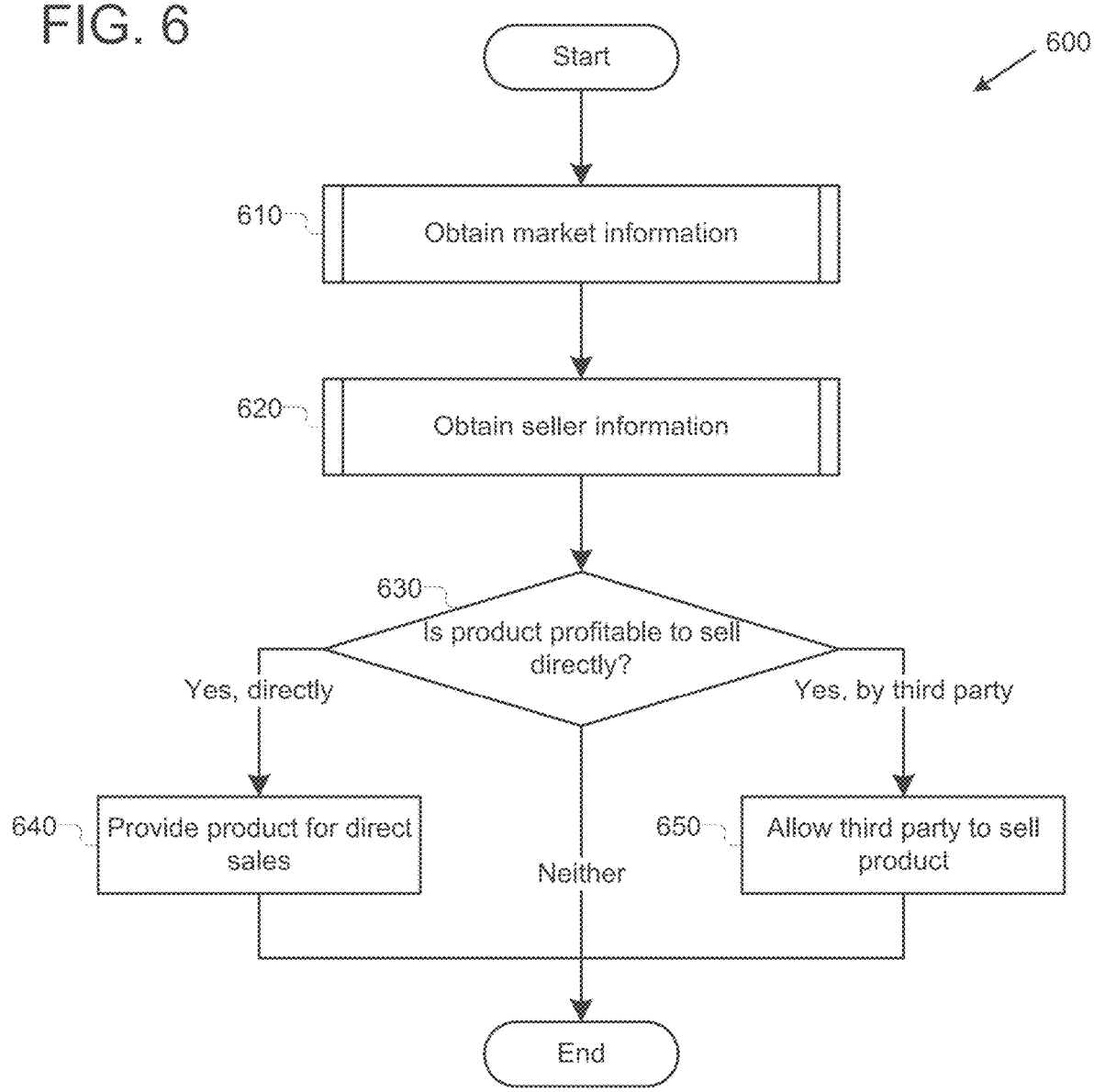
FIG. 6 is a flowchart illustrating an example process for determining whether to sell a product or service, in accordance with various embodiments.

FIG. 6 is a flowchart illustrating an example process 600 for determining whether to sell a product or service, in accordance with various embodiments. In various embodiments, process 600 may implement 340 of process 300 of FIG. 3. While particular examples and orders of operations are illustrated in FIG. 6, in various embodiments, these operations may be re-ordered, broken into additional operations, combined, and/or omitted altogether. In various embodiments, operations of process 600 may be performed by the SD 240 of the PDS 100. The process may begin at operation 610, where the SD 240 may obtain market information for the desired product or service. Embodiments of operation 610 are described below with reference to process 700 of FIG. 7.

Figure 7:
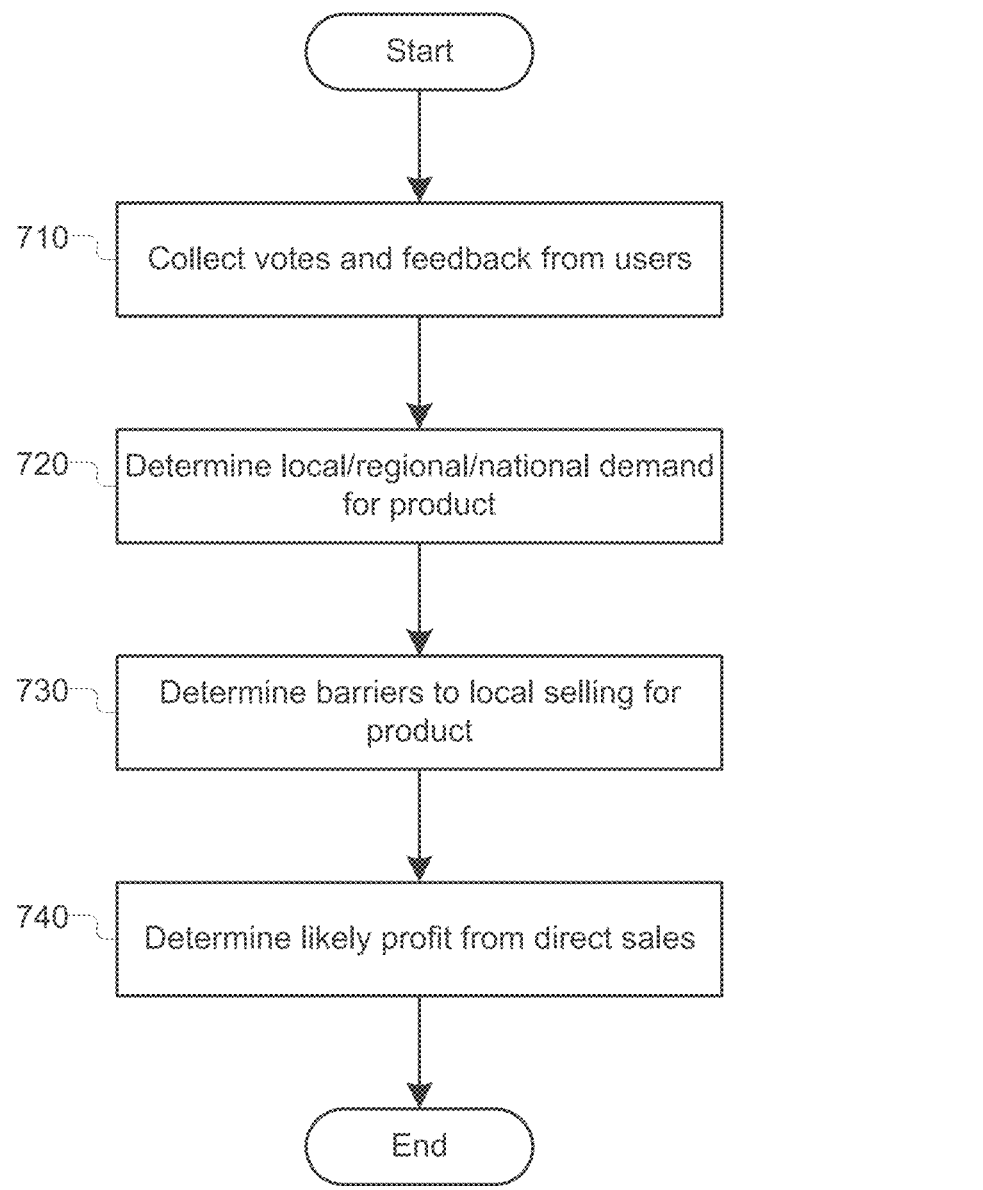
FIG. 7 is a flowchart illustrating an example process for obtaining market information, in accordance with various embodiments.

FIG. 7 is a flowchart illustrating an example process 700 for obtaining market information, in accordance with various embodiments. In various embodiments, process 700 may implement 610 of process 600 of FIG. 6. While particular examples and orders of operations are illustrated in FIG. 7, in various embodiments, these operations may be re-ordered, broken into additional operations, combined, and/or omitted altogether. In various embodiments, operations of process 700 may be performed by the SD 240 of the PDS 100. The process may begin at operation 710, where the SD 240 may collect votes (and any other feedback) provided by customers through the product demand page 150. Such feedback may be collected, in various embodiments, from the customer demand storage 235. Next, at operation 720, the SD 240 may determine demand for the product. In various embodiments, the SD 240 may be configured to determine demand at various geographical levels, such as locally, regionally, and/or nationally. In other embodiments, the SD 240 may be configured to determine demand over other cross-sections of customers, such as income, gender, common interests, etc. Next, at operation 730, the SD 240 may determine whether any barriers may exist to localized selling of the desired product. For example, if a desired product is not legal, or is subject to heavy tariff, then the existence of these regulations may reduce the likely profit to be made by selling the desired product, and make it less likely to be sold. Finally, at operation 740, the SD 240 may determine a likely profit from direct sales (i.e. from sales by the e-commerce system 200). The process may then end.

Figure 8:
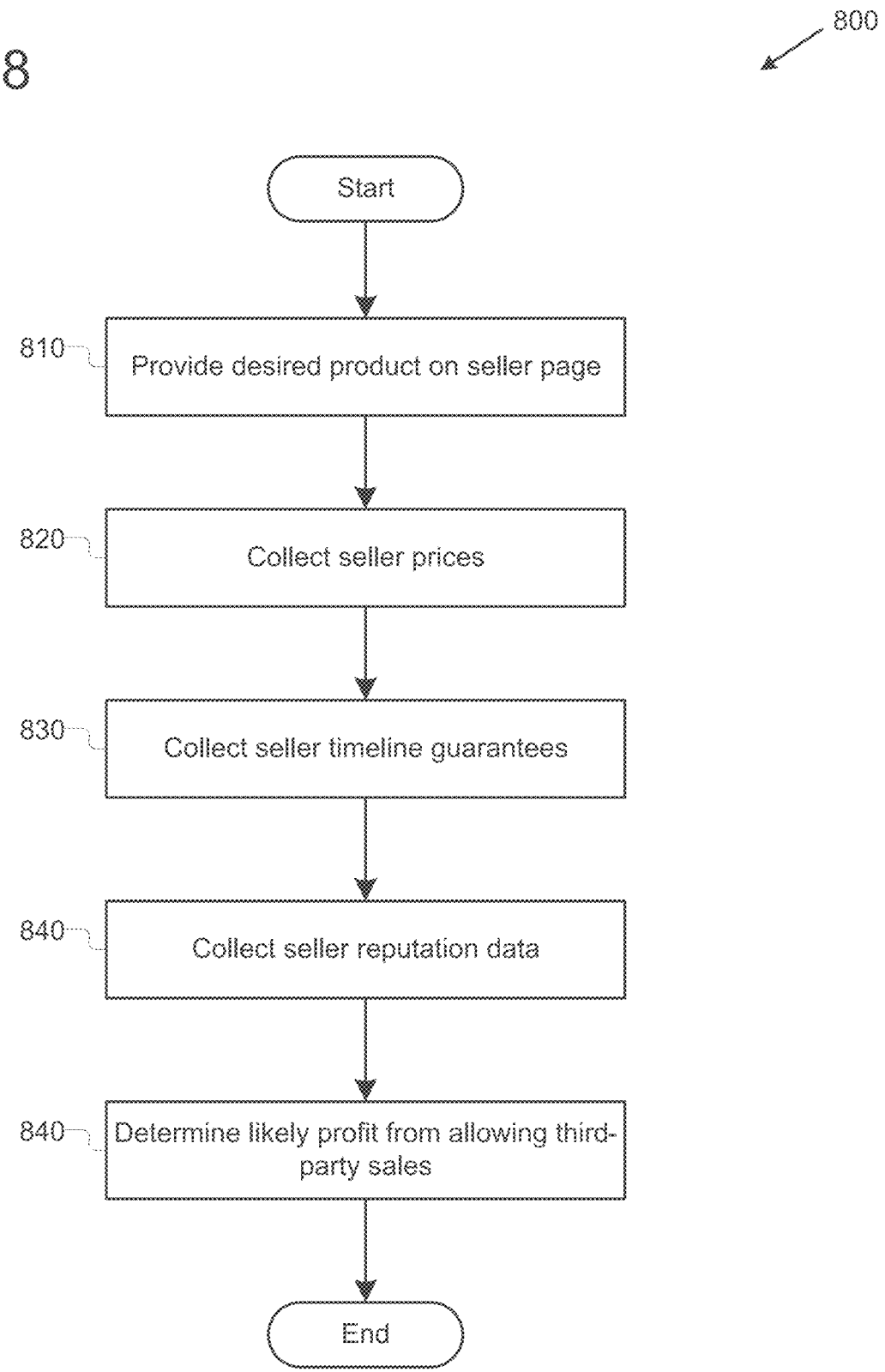
FIG. 8 is a flowchart illustrating an example process for obtaining seller information, in accordance with various embodiments.

Returning now to process 600 of FIG. 6, at operation 620, the SD 240 may obtain seller information for the desired product or service. Embodiments of operation 620 are described below with reference to process 800 of FIG. 8. FIG. 8 is a flowchart illustrating an example process 800 for obtaining seller information, in accordance with various embodiments. In various embodiments, process 800 may implement 620 of process 600 of FIG. 6. While particular examples and orders of operations are illustrated in FIG. 8, in various embodiments, these operations may be re-ordered, broken into additional operations, combined, and/or omitted altogether. In various embodiments, operations of process 800 may be performed by the SD 240 of the PDS 100. The process may begin at operation 810, where the SD 810 may provide the desired product or service on a seller page and invite feedback from sellers. Next, at operation 820, the SD 240 may collect prices that the sellers want for selling the desired product or service. In various embodiments, the price may be provided at different levels depending on the number of products or services a seller may be willing to provide. Next, at operation 830 the SD 240 may collect timeline guarantees for each seller. For example, a seller may guarantee that it can provide 100 units of a desired product in one month, or 500 in two months. Next, at operation 840, the SD 240 may collect reputation data for each responding seller. For example, the SD 240 may determine reputation data from a history of other products or services that have been sold through the e-commerce system 200. In another embodiment, the SD 240 may determine reputation data from publicly available reviews or other databases that have information about past seller performance. Finally, at operation 850, the SD 240 may determine a likely profit to be bad from allowing the seller to sell as a third-party through the e-commerce system 200. The process may then end.

Returning now to process 600 of FIG. 6, at decision operation 630, the SD 240 may determine whether it is likely to be profitable (and/or to generate substantial revenue) for the e-commerce system 200 to directly sell the desired product or service. If so, then at operation 640, the SD 240 may cause the e-commerce system 200 to provide the desired product or service for purchase. If, however, it is not profitable for the e-commerce system 200 to directly sell the desired product or service, but it would be profitable for a third party to sell the desired product or service through the e-commerce system 200, then at operation 650 the SD 240 may cause the e-commerce system 200 to allow a seller to sell the desired product as a third party through the e-commerce system 200. If profit is unlikely either way, then desired product or service may not be offered for purchase. In either event, the process may then end.

Figure 9:
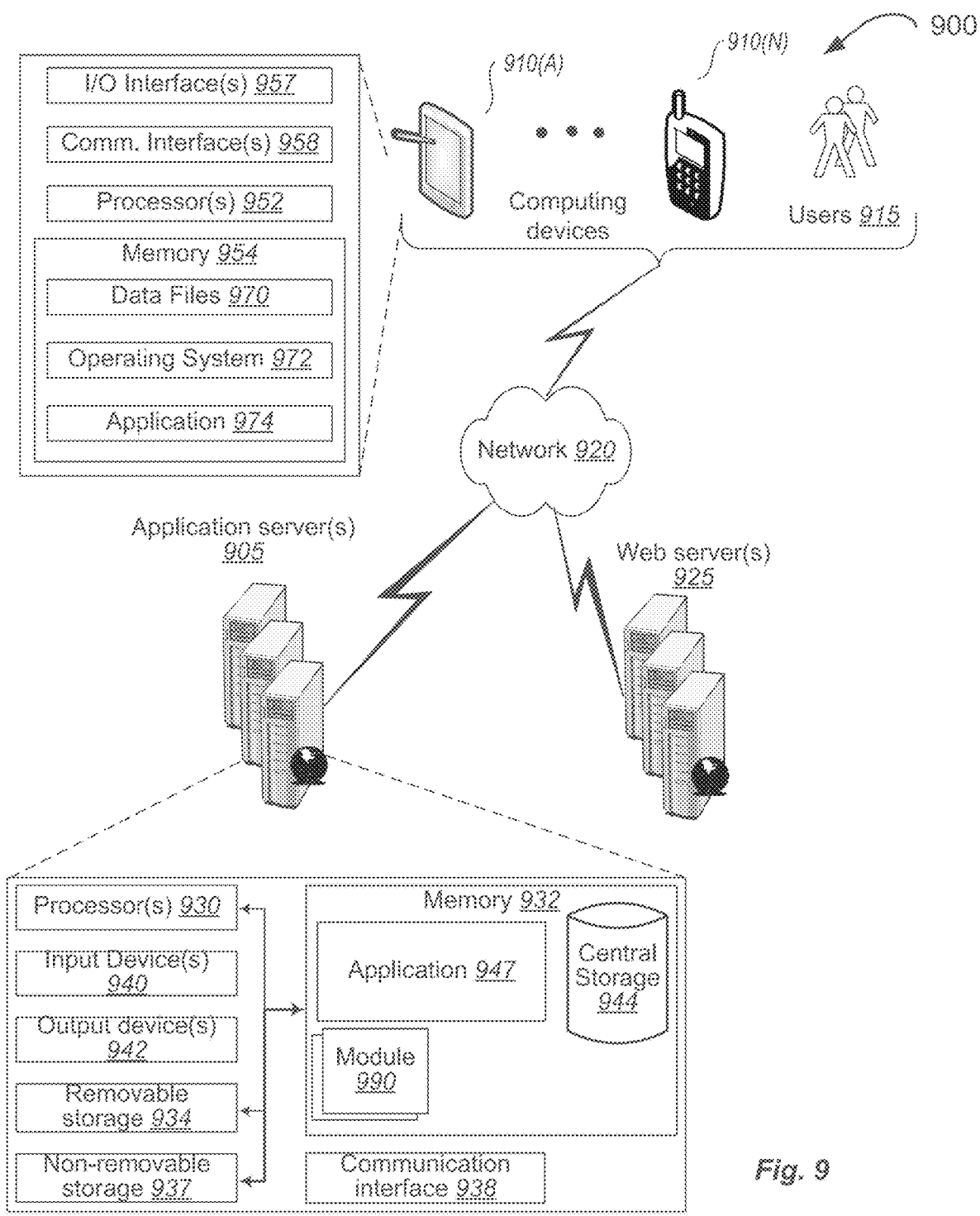
FIG. 9 illustrates an example computing environment in which embodiments described in the present disclosure may be implemented in accordance with various embodiments.

FIG. 9 illustrates an example of an illustrative computing environment 900 for implementing aspects in accordance with various embodiments described herein. The illustrative computing environment 900 may include one or more electronic computing devices 910(A)-910(N), which may include any appropriate device operable to send and receive requests, messages, or information over an appropriate network 920. Examples of such computing devices may include personal computers, smartphones, cell phones, handheld messaging devices, laptop computers, set-top boxes, personal data assistants, electronic book readers, tablet computers, and the like.

The computing devices 910(A)-910(N) may include a processor 952 and memory 954 for storing processor-executable instructions, such as data files 970, operating system 972, and one or more applications 974. The operating system 972 may be a general purpose operating system such as a Microsoft Windows® operating system, a UNIX® operating system, a Linux® operating system or an operating system specifically written for and tailored to the computing devices 910(A)-910(N).

The computing devices 910(A)-910(N) may further include at least one or both of the following elements: input/output interface 957 and communication interface 958. The communication interface 958 may enable the computing devices 910(A)-910(N) to communicate data, control signals, data requests, and other information with other resources including computers, data sources, storage devices, and the like, over the appropriate computer network 920 such as the Internet, via wired or wireless connections. The input/output interface 957 may enable the computing devices 910(A)-910(N) to obtain data input from a variety of devices including, but not limited to, a digital pen, a touch screen, a keyboard, a mouse, a scanner and the like. In addition to the illustrative components described above, a display interface (not shown) may be used for outputting display information to a computer user 915. Typically, the display information may be outputted by the display interface via a display device (e.g., a CRT monitor, an LCD screen, a touch screen, a television, an integrated screen or sets of screens, etc.).

The network 920 may include any appropriate network, including an intranet, the Internet, a cellular network, a local area network, a personal network or any other such network or combination thereof. Components used for such a system can depend at least in part upon the type of network and/or environment selected. Protocols and components for communicating via such a network are well known and will not be discussed herein in detail. Communication over the network may be enabled by wired or wireless connections, and combinations thereof.

The memory 954 may generally comprise RAM, ROM and/or other permanent memory. Thus, in addition to storage in read/write memory (RAM), programming instructions may also be embodied in read-only format, such as those found in ROM or other permanent memory.

The illustrative computing environment 900 may include at least one application server 905 including, or associated with, one or more processors 930, input devices 940, output devices 942, removable storage 934, and non-removable storage 937 that may be connected to a communication interface 938 and memory 932. The memory 932 may include, but is not limited to, one or more applications 947.

The memory 932 may further include a centralized storage 944. As used herein, the centralized storage 944 may include any device or combination of devices capable of storing, accessing, and retrieving data, which may include any combination and number of data servers, databases, data storage devices and data storage media, in any standard, distributed or clustered environment. It should be understood that there may be many other aspects that may need to be stored in the memory 932, such as user access right information, which may be stored in any of the above-listed mechanisms as appropriate.

The memory 932 may further include, or be coupled with, one or more modules 990 which may correspond, for example, to the PDS 100, DPG 220, and/or SD 240, as described above.

The application server 905 may include any appropriate hardware and software for integrating with the centralized storage 944 as needed to execute aspects of one or more applications for the computing devices 910(A)-910(N), handling a majority of the data access and business logic for an application. The application server 905 may provide access control services in cooperation with the centralized storage 944, and is able to generate content such as text, graphics, audio and/or video to be transferred to a viewer, which may be served to the viewer by a Web server 925 in the form of HTML, XML or another appropriate structured language in this example. The handling of all requests and responses, (e.g., requests for item information and the information provided in response) as well as the delivery of content between the computing devices 910(A)-910(N) and the application server 905 may be handled by the Web server 925.

It should be understood that the Web and application servers 905 and 925 are not required and are merely example components, as the applications and software components discussed herein may be executed on any appropriate device or host machine, such as described elsewhere herein. Each server 905 or 925 may include an operating system that may provide executable program instructions for the general administration and operation of that server, and may include a computer-readable medium storing instructions that, when executed by a processor (e.g., 930) of the server, may allow the server to perform its intended functions. Suitable implementations for the operating system and general functionality of the servers are known or commercially available, and are readily implemented by persons having ordinary skill in the art, particularly in light of the disclosure herein.

The illustrative computing environment 900 may include a distributed computing environment utilizing several computer systems and components that may be interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the illustrative computing environment 900 in FIG. 9 should be taken as being illustrative in nature, and not limited to the scope of the disclosure. In embodiments one or more of the computing devices 910A or 910N may include or be directly coupled with a memory such as memory 932 that may include one or more modules 990 and/or the centralized storage 944.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, limited only by the claims.

What is claimed is:

1. A computing device, comprising:
   a processor, and
   a memory storing a first database configured to store a first set of sale webpage data corresponding to products currently available for purchase and a second database configured to store a second set of product demand webpage data corresponding to products that are currently unavailable for purchase, the memory further storing computer-executable instructions that, when executed with the processor, cause the computing device to, at least:
   detect a search query for a product, the search query being submitted by a first user device;
   execute a first search by executing the search query against the first database configured to store the first set of sale webpage data corresponding to products currently available for purchase, wherein executing the search query returns a first determination that the product is unavailable for purchase;
   execute a second search by executing the search query against the second database configured to store a second set of product demand webpage data corresponding to products that are currently unavailable for purchase, wherein executing the search query against the second database returns a second determination that product demand webpage data for the product does not exist;
   in response to determining with the first search that the product is unavailable for purchase and determining with the second search that product demand webpage data for the product does not exist, obtain, from the first user device, product data specific to the product utilizing a user interface provided by the computing device;
   in response to determining with the first search that the product is unavailable for purchase, determining with the second search that the product demand webpage data for the product does not exist, and obtaining the product data specific to the product, generate product demand webpage data specific to the product, the product demand webpage data comprising the obtained product data and an interface element for obtaining feedback from one or more users;
   provision the product demand webpage data to the second database;
   provide a first set of search results in response to the search query, the first set of search results comprising a listing for the product;
   in response to detecting a selection of the listing, providing the product demand webpage data from the second database to cause a product demand webpage to be rendered at the first user device, the product demand webpage presenting the product data specific to the product and the interface element; and
   store first feedback received from the first user device utilizing the interface element of the product demand webpage, the first feedback being stored in the second database for subsequent use.

2. The computing device of claim 1, storing further instructions that are executable with the processor to cause the computing device to:
   detect a subsequent search request for the product, the subsequent search request submitted by a second user device;
   execute corresponding searches against the first database and the second database in response to the subsequent search request;
   retrieve the product demand webpage data from the second database in response to the subsequent search request;
   provide the product demand webpage data in response to the subsequent search request, wherein providing the product demand webpage data causes the product demand webpage to be rendered at the second user device in response to the subsequent search request, and wherein the product demand webpage presents the product data specific to the product and the interface element; and store, in the second database, second feedback obtained from the second user device utilizing the interface element of the product demand webpage.

3. The computing device of claim 1, storing further instructions that are executable with the processor to cause the computing device to:

generate a unique identifier for the product; and store the product demand webpage data in the first database as being associated with the unique identifier.

4. The computing device of claim 3, storing further instructions that are executable with the processor to cause the computing device to:

provide the product demand webpage data in response to yet another search request for the product; and receive third feedback from a third user device utilizing the interface element of the product demand webpage.

5. The computing device of claim 1, storing further instructions that are executable with the processor to cause the computing device to:

receive a second search request for a second product from a second user device;

execute corresponding searches against the first database and the second database in response to the second search request;

in response to the determining with the corresponding searches that the second product is unavailable for purchase and that a respective product demand webpage data for the second product does not exist, obtain second product data specific to the second product from the second user device utilizing the user interface;

generate second product demand webpage data specific to the second product, the second product demand webpage data comprising the second product data specific to the second product; and provision, to the second database, the second product demand webpage data comprising the second product data specific to the second product.

6. The computing device of claim 5, wherein generating the second product demand webpage data specific to the second product comprises configuring the second product demand webpage data to include one or more user interface elements for obtaining feedback from users.

7. The computing device of claim 1, wherein the product is unavailable to purchase via the product demand webpage.

8. The computing device of claim 1, storing further instructions that are executable with the processor to cause the computing device to request the product data specific to the product, wherein requesting the product data comprises at least one of: providing the user interface for entering the product data specific to the product, requesting identification of a remote webpage associated with product information of the product, or requesting a uniform product code for the product.

9. The computing device of claim 1, storing further instructions that are executable with the processor to cause the computing device to validate the product data specific to the product.

10. The computing device of claim 1, storing further instructions that are executable with the processor to cause the computing device to:

determine that the product is to be offered for purchase based at least in part on feedback provided at the product demand webpage utilizing the interface element, the feedback being provided by two or more users;

generate sales webpage data specific to the product, the sales webpage data comprising a purchase interface element for purchasing the product; and provide the sales webpage data in response to a future search request for the product, wherein providing the sales webpage data causes a sales webpage to be rendered at a requesting user device in response to the future search request, wherein the sales webpage presents the purchase interface element for purchasing the product.

11. The computing device of claim 10, storing further instructions that are executable with the processor to cause the computing device to notify a first user that the product is available for purchase based at least in part on the first feedback stored.

12. The computing device of claim 10, storing further instructions that are executable with the processor to cause the computing device to obtain seller information from a potential seller of the product regarding an ability of the potential seller to provide the product.

13. The computing device of claim 12, wherein the seller information is obtained from a seller webpage provided by the computing device, wherein the seller webpage presents information about the product.

14. The computing device of claim 12, wherein the seller information comprises at least one of: price data, timeline data, or reputation data associated with the seller.

15. The computing device of claim 12, wherein determining that the product is to be offered for purchase is further based at least in part on the seller information.

16. The computing device of claim 12, storing further instructions that are executable with the processor to cause the computing device to:

generate sales webpage data specific to the product;

provide the sales webpage data to cause a sales webpage specific to the product to be rendered; and receive an order for the product utilizing the sales webpage.

17. The computing device of claim 16, wherein the sales webpage is provides at least one different interface element than the interface element provided in the product demand webpage.

18. The computing device of claim 16, storing further instructions that are executable with the processor to cause the computing device to:

receive an additional search request for the product from an additional user device; and in response to the additional search request, provide the sales webpage data to cause the sales webpage to be rendered at the additional user device.

19. The computing device of claim 16, storing further instructions that are executable with the processor to cause the computing device to search the first database for the sales webpage data.

20. The computing device of claim 11, wherein a user interface element for purchasing the product is unavailable from the product demand webpage.

* * * * *